Figure 1:
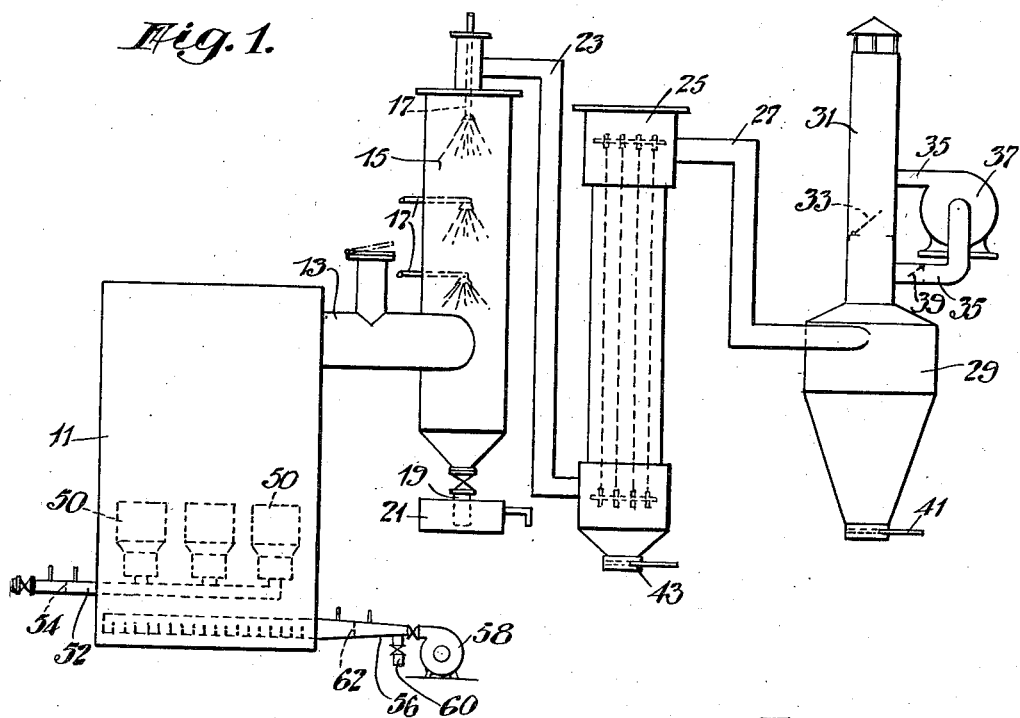

April 30, 1935.   T. P. KELLER   1,999,541
CARBON BLACK PRODUCTION
Filed Sept. 5, 1931   2 Sheets-Sheet 1

INVENTOR
Theodore P. Keller
BY Edmund G. Borden
ATTORNEY

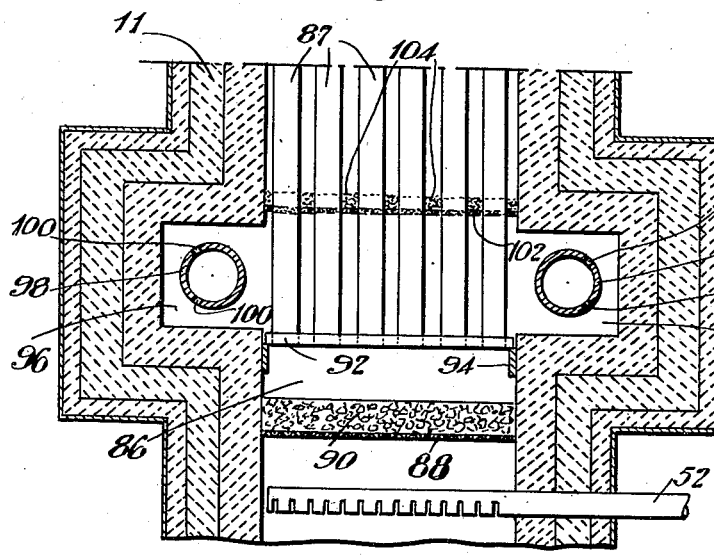
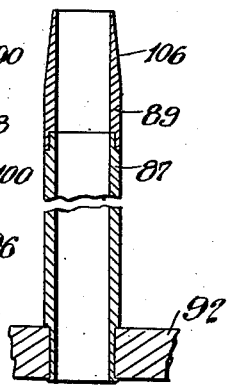
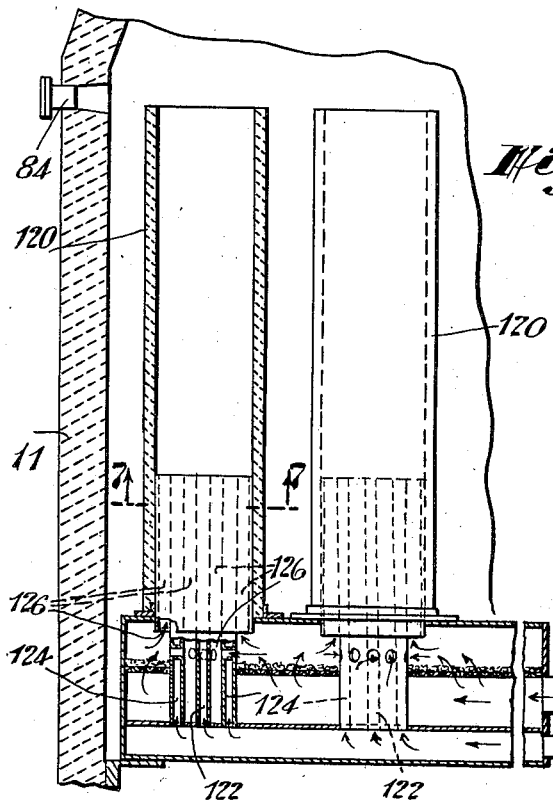
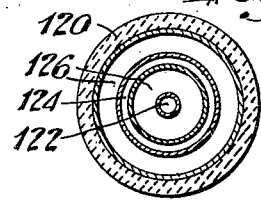

Patented Apr. 30, 1935

1,999,541

UNITED STATES PATENT OFFICE 1,999,541

CARBON BLACK PRODUCTION

Theodore P. Keller, Elizabeth, N. J., assignor to Doherty Research Company, New York, N. Y., a corporation of Delaware Application September 5, 1931, Serial No. 561,416

13 Claims. (Cl. 134—60)

This invention relates to the production of carbon black, and more particularly it concerns a method for producing carbon black by the partial combustion of carbonaceous gases and vapors such as natural gas or other hydrocarbons in an enclosed heat-insulated retort having an unobstructed interior portion,—and the product produced thereby.

The invention is closely related to and is an improvement upon the carbon black manufacturing processes set out in U. S. Letters Patent No. 1,902,797, granted March 21st, 1933 to Stephen P. Burke, and in U. S. Letters Patent No. 1,902,753, granted March 21st, 1933 to David J. Beaver, in the latter of which processes a plurality of spaced narrow parallel streams of hydrocarbon gases or vapors, interspersed with air streams, are introduced through a suitably-designed burner into an unobstructed highly heated retort at gas-air velocity ratios ranging from 1:.67 to 1:2.2. Combustion of the hydrocarbon stream occurs progressively at the surface of interfacial contact thereof with adjacent air streams, each of the latter of which flows parallel to and surrounds a gas stream.

Processes are already known for the production of carbon black involving the combustion of portions of a hydrocarbon gas in order to facilitate thermal decomposition of other portions,—resulting in carbon black formation. At present, probably most of the carbon blacks used in the industries such as in rubber compounding, are the so-called impingement blacks or channel process blacks, produced by partial combustion processes in which a stream of hydrocarbon is burned in the open air immediately below a relatively cool solid surface while surrounded by an excess of air amounting to several hundred percent of that required for complete combustion of the hydrocarbons.

At the time of its adoption in the rubber industry, manufacturers utilizing carbon black found it necessary to set up standards of quality based on the physical properties of the impingement blacks then available. However, these "impingement" processes produce very low yields of carbon black,—much of the carbon components of the hydrocarbon being converted to CO and $CO_2$.

In order to obtain larger yields of carbon black having in general the physical properties of impingement blacks and meeting the specifications for such blacks that have been established by certain industries, attempts have been made in the past to effect the more efficient utilization of hydrocarbons for carbon black production by the combustion of selected portions thereof within highly-heated retorts, from which the mixed gases carrying carbon black in suspension are continuously removed. Such processes in most instances have yielded carbon blacks of non-uniform composition, varying materially from channel process carbon blacks in certain physical properties although made in somewhat higher yields than those obtained by the channel process.

It was not until the entry of Burke and Beaver into the field that carbon black manufacturers appreciated the importance, in the interest both of the yield and quality of carbon black produced, of carefully controlling the conditions under which air and gas are brought into contact and selected portions thereof combusted.

The processes set out in the two aforementioned patents have made possible a much higher efficiency of hydrocarbon conversion to carbon black than had been effected by previously-known combustion methods. However, the carbon black obtained, while of uniform quality, had physical characteristics varying in certain important respects from those of channel blacks, and requiring essentially different techniques in connection with its use in rubber compounding and the like than when channel blacks are used.

Among the more important objects of the present invention are to provide in an improved manner for the production of a carbon black having in general the physical characteristics heretofore closely associated with channel process blacks; to provide a process for the manufacture of a high grade carbon black in a heated enclosed space while substantially preventing the fouling of the burner tips and while keeping the burner ducts cool; to provide in a novel manner for the controlled introduction into a heated retort, in stream line, viscous flow under a uniform controlled pressure within a range from slightly below atmospheric to slightly above atmospheric, of rapidly moving hydrocarbon gases or vapors surrounded by a flowing stream of air or other combustion-supporting gas; to provide a process adapted for the controlled production of a new carbon black having valuable physical properties approximating those of impingement blacks; and to produce a carbon black having certain of the desirable properties of impingement blacks and in addition thereto certain desirable properties not possessed by the latter.

In its broadest sense the process involves flowing parallel streams of air and gaseous or vaporous hydrocarbon upwardly within a heated unobstructed space, whereby adjacent streams of air and gas come into interfacial contact,—while substantially preventing turbulence in the flowing streams. Some combustion occurs at the interfaces of the air and gas streams due to interdiffusion, a high temperature is there developed, and a viscous flame front is formed around each stream of hydrocarbon gas. These uniform thin flame fronts maintain positions around each of the flowing non-turbulent streams of hydrocarbon gas, and supply the heat for decomposing the hydrocarbon within the flame fronts during stream line movement of the flowing contiguous gas and air streams within the highly heated combustion zone of the flames.

The gas is introduced into the retort in relatively thin spaced sheets or columns through burner ducts which may be formed long and narrow,—or tubular,—or which may be in the form of concentric ducts,—the air ducts alternating with gas ducts, and the central and extreme outer ones of which are air ducts.

The relative rates of flow of the hydrocarbon and air streams are carefully controlled at a preselected velocity ratio within the range of from 1:.67 to 1:2; and the preferred gas:air velocity ratio is within the range from 1:.8 to 1:1.2.

The contacting streams of hydrocarbon and air are introduced into the lower interior of the retort at such velocities that the time during which the carbon black produced by thermal decomposition of the hydrocarbon within each flame sheath remains within the high temperature zone is carefully limited to a period ranging from .05 second to not longer than .5 second. Preferably the time of contact employed in the practice of the invention is within the range from .2 to .4 second.

Figure 2:
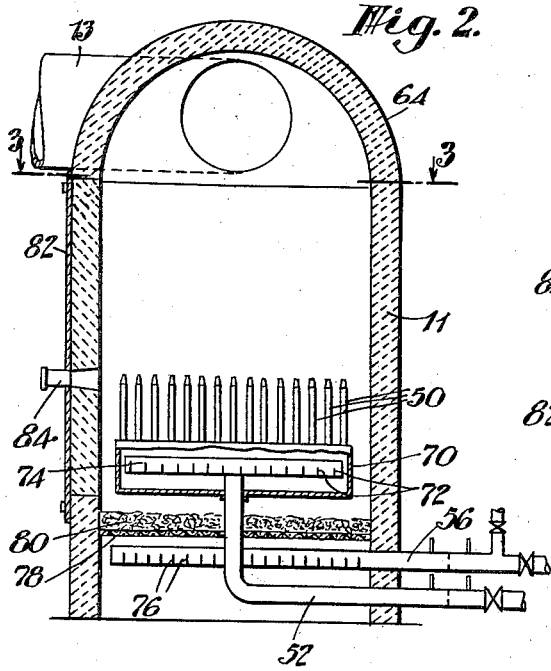
Figure 3:
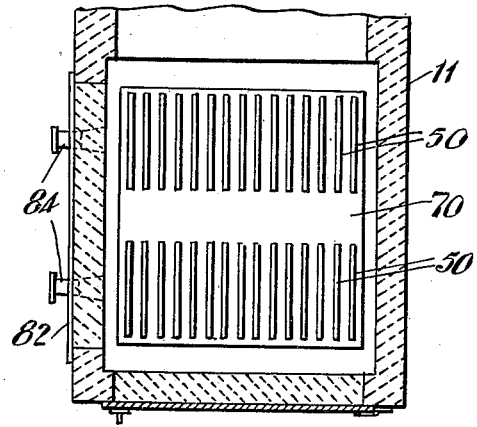

In the accompanying drawings showing apparatus adapted for the practice of the invention, Fig. 1 is a somewhat diagrammatic showing in vertical elevation of apparatus adapted for the manufacture and recovery of carbon black in accordance with the invention; Fig. 2 shows in vertical cross section a carbon black retort embodying the invention; Fig. 3 is a horizontal section taken along the lines 3—3 of Fig. 2, parts being broken away; Fig. 4 shows in vertical section a portion of a retort illustrating a modified construction in which the oil supply ducts discharge into the furnace above the lower ends of tubular gas burners; Fig. 5 shows in enlarged vertical section one of the tubular gas ducts having removable tips, preferably employed with the modification shown in Fig. 4; Fig. 6 shows in vertical section modified apparatus employing a plurality of concentric gas and air duct assemblies, parts being broken away; and Fig. 7 is a horizontal section somewhat enlarged taken through one of the air duct-gas duct assemblies of Fig. 6.

Referring now to Fig. 1, numeral 11 designates a vertically-disposed carbon black retort provided with heat-insulated side walls and top structure and having an upper interior portion free of checker brick or other obstruction which would interfere with the stream-line flow of gases moving upwardly through the retort. Leading from the upper part of the furnace is a gas and carbon black offtake 13 leading to a direct contact liquid spray cooler 15 with which it is connected tangentially.

Within the cooler 15 there is provided a number of spray nozzles 17 adapted to spray water downwardly in countercurrent contact with upwardly moving carbon black-laden gases in the cooler. Excess water is withdrawn in well-known manner from the lower part of the cooler 15 through a valve-controlled line 19 and sump 21,— or in any other suitable manner.

Combustion gases carrying carbon black in suspension and at temperatures above the dewpoint of the condensable vapors therein, are withdrawn from the upper part of the cooler 15 through conduit 23 and are conveyed into the lower portion of an electric precipitator 25 where the carbon black is agglomerated.

The mixed gases and the major portion of the carbon black then flow from the electric precipitator through conduit 27 into a cyclone separator 29 in which the carbon black is finally separated from the permanent gases and condensable vapors, these latter being discharged through the stack 31 direct to the atmosphere. A damper or valve 33 in the stack 31 permits cutting off direct communication between the separator 29 and the atmosphere when desired. A by-pass line 35 having therein an exhaust fan 37 and a damper or valve 39 permits forced withdrawal of gases from the separator 29 and their discharge to the atmosphere through stack 31 by suction induced by the fan 37. The carbon black is recovered through an outlet 41 in the base of the separator 29. Any carbon black deposited in the base of the electric precipitator 25 is withdrawn therefrom through a bottom outlet 43 therein.

In the lower portion of the retort 11, there is provided a plurality of closely grouped burners 50. In the form shown in Fig. 1, the burners are laterally-spaced apart in three separate parallel groups, the burners of each group being connected through a valved main conduit 52 with a supply of hydrocarbon gas or vapor preferably maintained under pressure. The conduit 52 has therein an orifice plate 54 adapted to facilitate control of the volume of hydrocarbon flowing through the said conduit under any given condition of pressure differential on the respective sides of the plate. An air conduit 56 connects the lower portion of the furnace beneath the burners 50 selectively as desired with an air blower 58 and with a valved conduit 60 open to the atmosphere. The conduit 56 has therein an orifice plate 62 similar in construction and manner of functioning to the plate 54, and which is adapted to facilitate control of the volume of flow of air through the conduit 56 to the retort 11.

The roof and adjacent parts of the retort 11 are designed for minimum interference with the free flow of gases from the retort to the cooler 15, and for insuring maintenance of uniform pressure conditions substantially throughout the upper portion of the retort.

In the retort construction of Figs. 2 and 3, the retort 11 has an arch-shaped top 64 with which the offtake line 13 communicates through a side wall. A plurality of elongated narrow burners are arranged within the retort 11 in two parallel groups, with the long sides of each burner arranged at right angles to the wall having therein the outlet 13. Each of the burners extends upwardly a distance preferably about one fifth of the height of the retort interior; and each burner has its tip preferably bevelled in the manner indicated in Figs. 2 and 5. Bevelled removable tips of heat-resistant metal may be employed if desired.

The lower portion of each burner 50 of each group thereof is connected with a respective gas header 70 to which gas is uniformly distributed through slots 72 in a distributing member 74 connected with the main gas conduit 52. The air conduit 56 extends crosswise of the retort below each of the headers 70, and is provided with bottom slots 76 through which air is distributed to the retort. A metal screen 78 or other suitable permeable member is mounted in the retort above the air conduit 56 and supports a quantity of refractory bodies 80 preferably approximating one to three inches in cross-section and adapted to uniformly distribute the air flowing upwardly into the retort from the conduit 56. The retort as shown is provided with an insulated door 82 having therein a peep-sight 84 in line with the top of the burners of each group, for permitting observation of the character of the flames during operation of the unit.

In the modification shown in Fig. 4, the hydrocarbon gas is introduced into the retort and is uniformly distributed within a space 86 immediately below the inlet ends of a series of spaced tubular burners 87 of heat-resistant metal by means of a metal screen 88 supporting refractory bodies 90 and constructed similarly to the screen 78 and the refractory bodies 80 of Fig. 2. The burners 87 of Fig. 4 are supported upon an apertured plate 92 of heat-resistant metal or its equivalent carried upon brackets 94 at the side walls of the retort.

Immediately above the plate 92, the interior of the retort is laterally enlarged to define a passage 96 which accomodates air lines 98. The latter are provided with apertures 100, and are adjustable, so that they may be turned for directing air in the desired direction, for the purpose of uniformly distributing air in the lower portion of the retort around each of the burners 87. If desired, a screen 102 carrying thereon refractory bodies 104 may be mounted in the walls of the retort surrounding each of the burners 87 at an elevation somewhat above the passage 96 for further facilitating air distribution around the lower portion of the burners.

The burners 87 shown in Fig. 4 are circular in cross-section, and preferably are provided with demountable burner tips 89 of heat-resistant metal having their upper margins bevelled, as shown at 106 in Fig. 5.

In the modification shown in Fig. 6, the furnace 11 houses a closely-spaced plurality of vertically-disposed refractory tubular members 120, each forming the side wall of a burner assembly. Each assembly is made up of at least two spaced, concentric narrow gas conduits 122 and 124, and intermediate air conduits 126 concentrically arranged with respect to the gas ducts and to each other. The central tubular duct 122 is preferably a gas duct; and the outer of the concentric ducts, adjacent the side wall of the member 120, is an air duct. Each of the gas ducts 122, 124, communicate with the main gas conduit 52; and each of the air conduits 126 communicate with the main air conduit 56.

Where a plurality of carbon black furnaces are connected with a single carbon black collecting system, each furnace is provided with an off-take line of size sufficient to prevent substantial pressure drop between it and the next unit in line, in order to facilitate uniform rapid removal of carbon black from the furnace.

In the practice of the present invention according to a preferred modification, natural gas or other hydrocarbon having a heating value of from 1000 to 2500 B. t. u. or more per cubic foot is introduced into the retort 11 at a uniform rate through each gas duct; and air is simultaneously introduced into the retort through the conduit 56, and,—after uniform distribution therein,—moves upwardly around each burner. The pressure upon the gas line 52 and that developed in the air line 56 by the blower 58 are preferably so adjusted that the velocities of the gas and air moving past the burner outlets are approximately the same,—but the velocity ratio of gas to air may under suitable conditions vary as much as from 1:.67 to 1:2. The hot gaseous products of combustion and carbon black flow from the retort 11 and are drawn successively through the cooling and carbon black recovery apparatus by natural draft within the stack 31, regulated by means of the stack valve 33. The exhaust fan may also be employed if desired to effect or modify the flow of combustion products through the system.

Preferably, the amount of air supplied to each burner is sufficient to support the complete combustion of but from 55 to 80% of the hydrocarbons flowing through the burners. Even more air than this can be employed, up to at least 120% of that required for complete combustion of the hydrocarbons,—where it is desired to sacrifice yields for the purpose of improving the color value and certain other physical properties of the carbon black.

The burner is so designed that, for a desired gas-air volume ratio providing an amount of air capable of supporting complete combustion of a preselected portion of a hydrocarbon of determinate heating value,—the relative air duct-gas duct area ratio of the burner assembly will give a gas-air velocity ratio facilitating viscous, stream-line flow of the streams of gases and carbon black within the high temperature combustion zone of the retort. For instance, where propane is the hydrocarbon used, and a velocity ratio of unity is desired, with the use of air sufficient to support complete combustion of 60% of the hydrocarbons flowing within the retort; an air duct-gas duct area ratio of around 14:1 is employed; while under similar conditions utilizing natural gas and employing an amount of air equivalent to that required for complete combustion of 65% of the hydrocarbon, an air duct-gas duct area ratio of 6.5 to 1 is employed.

The effective thickness of the gas duct at the burner tips preferably is not more than five eighths of an inch, when employing either round or flattened burners. Long flat burners having narrow apertures of 1/8" thickness give particularly desirable results when treating natural gas or methane, although burner thicknesses twice this value are likewise highly satisfactory, as are tubular burners of from 1/4" to 1/2" diameter, in combustion ranges employing from 40% to 120% of the air required for complete combustion of the hydrocarbon. The use of tubular gas ducts permits development of a flame of minimum length and of maximum stability, when operating the furnace either under atmospheric or sub-atmospheric pressure. This facilitates close control of the short interval of time during which the carbon black in the gas streams remains in the high temperature reaction zone.

In a second modification of the process, the flow of hot gaseous products of combustion and carbon black through the retort 11 and the cooling and carbon black recovery apparatus is accomplished by suction induced by the exhaust fan 37,—the valve 33 in stack 31 being closed and valve 39 in line 35 being open. A slight sub-atmospheric pressure preferably equivalent to from 5″ to 7″ of water or less is thus maintained in the retort 11, inducing a flow of gas thereinto through the burners past the apertured member 54 in the main gas conduit; and simultaneously inducing an appropriate flow of air into the retort around the burners through the apertured member 62 in air conduit 56. In this modification it is not necessary to operate the blower 58; and the air may enter through valved conduit 60.

During combustion of portions of the hydrocarbon within the highly heated retort, high temperatures in the neighborhood of 1100° C. to 1300° C. or above are developed and, due to the design of the burners, the flames entering the furnace from each gas duct radiate directly to each other the major portion of their energy, where it becomes effective for decomposing the hydrocarbon within the respective gas streams to form carbon black,—substantially all of the latter being formed and maintained out of contact with the retort walls or other solid surfaces until it has flowed from this high temperature zone.

An essential feature of the invention upon which the valuable properties of the carbon black produced depend is that of regulating the absolute velocity of the respective air and gas streams so that carbon black formed within each flame sheath is exposed to the high temperature of the combustion zone for preselected, extremely short periods of time ranging from .05 second to not more than half a second,—and preferably for from .2 second to .4 second,—while maintaining the relative velocities of the gas and air within the range mentioned, and while utilizing an amount of air capable of supporting complete combustion of from 40% to 80% or more of the hydrocarbon being reacted. Any tendency of the flames to bend laterally in cases where the exhaust outlet is in a side wall of the furnace, is substantially counter-acted by arranging the burners with their major transverse axes at right angles to the side wall housing the exhaust outlet.

It is within the scope of the present invention to vary the operation of the carbon black unit from that disclosed above wherein the flow of both the air and gas to the retort may be induced by the action of the exhaust fan 37, or whereby both the air and gas are introduced into the retort under positive pressure by suitable means such as herein described. The air may be introduced under positive pressure by a blower or the like, while the gas is drawn into the retort by suction; or the flow of air may be induced by suction, and the gas may be introduced under positive pressure maintained in the valved line 52.

The absolute velocities of the air and gas in the practice of the present invention are sufficiently high to keep the burner tips cool enough to prevent or materially retard their oxidation and destruction, and to prevent formation of carbon deposits upon the burner tips by the cracking of hydrocarbons at or in these tips. Absolute gas velocities as high as 5 linear feet per second have been employed without blowing the flames from the burner tips and without producing undesirable turbulence in the flowing air and gas streams within the retorts.

While natural gas because of its availability has been specifically referred to in the case, other hydrocarbon gases and vapors or mixtures thereof are likewise eminently suitable for use in the present invention. For instance the higher hydrocarbons of the paraffin series, wild gasoline and the volatile portion thereof recovered by weathering processes, casing head gas, and oil cracking still gases as obtained at refineries are now available in large quantities and have been satisfactorily employed in practicing the present invention.

Where hydrocarbons of high heating value, above 2000 B. t. u. per cu. ft., are employed,—such as those having B. t. u. values of from 2100 to 2300 per cu. ft. as in the case of residue gas from wild gasoline weathering tanks, the velocity of flame propogation is much higher than with gases of lower heating value, so that gas ducts having effective thicknesses as great as 5/8″ may be satisfactorily used; whereas when combusting natural gas the gas duct thickness preferably should not exceed 1/2″ under the conditions of operation described.

Of course it is to be understood that it is within the perview of the invention to use in place of air any other combustion-supporting gas, such as oxygen-enriched air, or chlorine.

The characteristics of the new carbon black produced by the process described above will now be described, particularly with reference to a comparison thereof with commercial channel process blacks on the one hand; and with those made by the process described in the Patent No. 1,902,753 of D. J. Beaver, on the other hand.

The new carbon black resembles channel process carbon blacks in the following respects:

1. It is a very finely divided frothy black powder made up of particles or aggregates or both, a large percentage of which are sub-microscopic in size.

2. It has approximately the same gravity or bulking value as channel blacks, varying from 10 to 20 pounds or more per cubic foot.

3. It has approximately the same specific gravity as channel blacks, averaging around 1.80.

4. When compounded with rubber in suitable proportions, the cured compounded stock has an ultimate tensile strength substantially the same as that of a similar rubber stock containing an equal proportion by weight of channel process carbon black.

5. Rubber stocks containing the new carbon black have approximately the same elongation before rupture as those containing an equal proportion by weight of channel process carbon blacks, at their optimum cures.

6. The new carbon black stiffens a rubber mix containing it about the same amount as an equal weight of channel process carbon black, at their optimum cures.

At the same times of cure, the new carbon black has a much greater rubber stiffening effect than the commercial impingement (channel process) blacks, at any given time of cure,—resembling in this respect carbon black made by the process disclosed in the Beaver patent.

The new carbon black differs from commercial channel process carbon blacks in the following respects:

1. It mills into rubber much more readily than the latter.

2. Much larger proportions of the new carbon black may be milled into rubber than is the case with commercial channel blacks. The maximum reinforcement of rubber by channel blacks is reached with proportions of approximately 20 volumes of carbon black to 100 volumes of rubber. 35 volumes or more of the new carbon black may be compounded with rubber. A rubber stock containing a 20 volume leading with the new carbon black has physical properties which are the equivalent of a similar rubber stock containing a like loading with commercial channel black. At a 35 volume loading the abrasion resistance of such stock is much greater than that of a similar stock containing a 20 volume loading with a commercial channel black.

The new carbon black has a lower oil absorption than commercial channel black,—generally having an oil absorption number around 80 to 100 cc. of linseed oil per 100 gr. of carbon black, compared to 120 cc. of oil for channel process blacks.

A rubber stock containing the new carbon black cures much faster than does the same rubber stock containing the same amount of a channel process carbon black.

The new carbon black imparts to a rubber compound containing it the optimum physical properties at a time of cure approximately ⅔ of that required for the cure of a similar rubber compound containing channel process carbon black.

Rubber stocks containing the new carbon black require much less accelerator than does the same stocks containing a like amount of a channel process carbon blacks. In a diphenylguanidine-accelerated stock, the new carbon black requires approximately only 1/10th of the amount of accelerator required by channel process carbon blacks for effecting a given rate of cure.

The new carbon black seen by the eye is jet black and has a blue black undertone, as contrasted with the brown undertone of channel process blacks. The color value of the new black ranges from 65% to 100% of that of channel process blacks, depending upon the conditions under which it is produced.

The method employed for testing the color value of the carbon blacks is that set out for "Tinting Strength", on page 62 of the U. S. Bureau of Mines Bulletin #192.

When incorporated into rubber in suitable proportions, the new carbon black imparts to the cured compounded stock containing it, a distinctly higher resistance to abrasion than does a like amount of channel process carbon black similarly compounded. Abrasion resistances have been noted varying from 103% to 127% of those obtained by use of channel process carbon blacks.

The new carbon black is substantially non-hygroscopic; and, when packed, varies in moisture content between .2 and .3%, irrespective of the humidity of the surrounding air; whereas channel blacks are hygroscopic, and will vary in moisture content up to 6% or above, depending on atmospheric conditions.

The new carbon black contains over 99% of carbon, and is practically free of adsorbed or combined oxygen. Consequently this carbon black greatly improves the ageing properties of rubber stocks containing it as compared to similar stocks containing like amounts of channel blacks.

The new carbon black yields a more resilient rubber stock than does channel process carbon black. The resilience is determined by dropping a 1¾" diameter ball of cured compounded rubber stock containing the carbon black to be tested from a height of 10 feet, and measuring the rebound. The values measured for cured rubber compounds containing the new carbon black are in the neighborhood of 50% higher than those obtained for a like rubber compound in which an equivalent amount of a standard channel process black has been employed.

Uncured rubber stocks,—of the type low in softener,—which contain the new carbon black are approximately twice as plastic as similar stocks containing equal amounts of channel blacks. Therefore it is possible to tube and calendar stocks containing the new black with less softener than is required with similar stocks containing channel blacks.

Rubber stocks containing the new carbon black have a lower hysteresis loss and permanent set than have like stocks containing channel process blacks,—thereby rendering the new black particularly well suited for use in rubber goods that are to be subjected to compression. Stocks containing it will not heat up as much on repeated compression as will the less resilient stocks containing channel blacks which have higher hysteresis losses.

The new carbon black differs from the carbon black set out in the aforementioned Beaver patent in having an apparent gravity midway between the Beaver carbon black and channel process carbon blacks.

It gives to rubber stocks compounded therewith an ultimate tensile strength and a resistance to tear greater than those imparted by the said Beaver process carbon black, and approximating that imparted by an equal weight of the best grades of commercial channel process carbon blacks.

The new carbon black imparts to cured rubber stocks containing it an elongation at the point of rupture midway between that obtained in similar rubber stocks containing the Beaver process carbon black and like stocks containing channel process carbon black.

The new carbon black has a much higher resistance to flexing than the Beaver process carbon black.

The new carbon black imparts to a rubber compound containing it a permanent set distinctly lower than that of a similar stock containing channel process black, and approximately that imparted to such a stock by the Beaver carbon black.

The tests for determining tensile, modulus, elongation, plasticity and ageing properties of rubber compounds containing carbon blacks were conducted in accordance with the standard testing methods adopted in the report of the Physical Testing Committee of the Rubber Division, American Chemical Society, and found on pages 535–540 and 1202 of vol. 17 of "Journal of Industrial & Engineering Chemistry (1925)."

The test for determining the abrasion resistance is the Williams test, set out on page 674 of vol. 19 "Journal of Industrial & Engineering Chemistry (1927)."

The stiffness of rubber is measured in terms of the load at a given elongation of a test piece. This was measured by determining the load in pounds per square inch of rubber,—calculated on the original cross section of the test piece,—that is necessary to stretch the test piece to five times its original length.

The oil adsorption was determined by the well-known Gardner test by mixing the carbon black with raw linseed oil and determining the number of c. c. s of the oil required to be mixed with 100 grams of carbon black, in order that the mass may be rolled into a ball and begin to smear a smooth, clean glass or porcelain.

The new carbon black may be incorporated with rubber in the usual way, such as by milling the same into the raw rubber, following which the milled mixture is compounded and is cured or vulcanized in the usual manner.

Having described my invention and certain specific modifications of operations in connection with the use of novel apparatus by which my new carbon black is produced,—what is claimed as new is:

1. In the process of producing carbon black by the partial combustion of hydrocarbons in an unobstructed, heated enclosed space, the improvement which comprises flowing a plurality of contiguous alternate thin streams of air and hydrocarbon gas through the said space while maintaining relative velocities of the respective gas and air streams within ratios ranging from 1:.67 to 1:2., the air being employed in an amount required for complete combustion of a regulated portion of the hydrocarbon gas within a range of from 55 to 80 per cent thereof burning portions of the said gas stream at its surfaces of contact with the air in a high temperature carbon black-forming zone, thereby forming carbon black and facilitating viscous stream-line flow of the said flowing streams, and adjusting the absolute velocity of the air and gas streams to cause removal from the high temperature zone of the resultant carbon black carried in the flowing gas stream for a regulated period of exposure to heat therein within the range of .05 of a second to not more than .4 seconds.

2. In the process of producing carbon black by the partial combustion of hydrocarbons in an unobstructed, heated enclosed space, the improvement which comprises flowing a plurality of contiguous alternate thin streams of air and hydrocarbon gas through the said space while maintaining relative velocities of the hydrocarbon gas and air streams within ratios ranging from 1:.67 to 1:2., the latter being employed in a regulated amount capable of effecting complete combustion of a regulated amount of the hydrocarbon gas within the range of from 55 to 80 per cent thereof, burning selected portions of the streams of hydrocarbon gas at their surfaces of contact with the air in a high temperature carbon black-forming zone, thereby producing heat and facilitating viscous streamline flow of the said streams, controlling the velocity of flow of the respective streams through the said space to maintain a rate adapted to remove from the high temperature zone the carbon black carried in the flowing gas streams after a regulated period of exposure to high temperatures therein within the range from .2 second to .4 second, and thereafter rapidly cooling and recovering the carbon black.

3. In the process of producing carbon black by the partial combustion of hydrocarbons in an unobstructed, heated enclosed space, the improvement which comprises flowing a plurality of contiguous alternate thin streams of air and hydrocarbon gas through the said space while maintaining relative velocities of the respective gas and air streams within ratios ranging from 1:.8 to 1:1.2, the air being employed in amounts sufficient for the complete combustion of a regulated amount of the hydrocarbon gas within the range of 55 to 80 per cent thereof, burning selected portions of the said gas at the surfaces of contact of the air-and gas streams thereby producing a high-temperature carbon black-forming zone and facilitating viscous streamline flow of the air and gas streams within the said zone, controlling the absolute velocity of the air and gas streams to cause removal from the high temperature zone of the carbon black carried in the flowing gas stream after a regulated period of exposure to the high temperature therein within the range from .2 second to .4 second.

4. In the process of producing carbon black by the partial combustion of hydrocarbons in a heated, enclosed space, the improvement which comprises drawing a plurality of alternate thin streams of air and hydrocarbon gas through the said space while maintaining relative velocities of the respective gas and air streams within ratios ranging from 1:.67 to 1:2., induced by suction exerted upon the said enclosed space, the air being employed in amounts sufficient for the complete combustion of a regulated amount of the hydrocarbon gas employed, which is at least 55 per cent thereof, burning portions of the hydrocarbon gas at the surfaces of contact of the respective streams in a high temperature carbon black-forming zone, thereby producing heat and maintaining viscous streamline flow of the said streams, and adjusting the absolute velocity of the gas streams flowing through the enclosed space to cause removal from the high temperature zone of the carbon black thus formed after a preselected period of exposure to heat therein within the range from .05 of a second to not more than .4 of a second.

5. The method of making carbon black comprising flowing into a heated, enclosed space, a plurality of spaced thin sheets between ⅛ to ½ inch in thickness and containing a gaseous hydrocarbon, burning portions of the respective sheets of hydrocarbon in a surrounding flowing atmosphere of air, the latter being present in amounts varying from 55% to 80% of that which would be required for complete combustion of the said hydrocarbon if premixed therewith, directly radiating the major portion of the radiant energy from the resultant flames to adjacent flames thereby decomposing the unburned portion of the hydrocarbon within each sheet thereof to produce carbon black substantially out of contact with solid surfaces, and rapidly removing the gas sheet carrying the carbon black from the region of the flames after preselected periods of exposure to the heat thereof within the range from .05 of a second to not more than .4 of a second.

6. In the art of forming carbon black by the partial combustion of a hydrocarbon, the steps which comprise burning in a heated, unobstructed, enclosed combustion zone a thin flowing stream of a hydrocarbon having a heating value of from 1000 to 2300 B. t. u. per cubic feet by the oxygen of an air stream flowing in contact therewith while limiting the amount of air to that sufficient for complete combustion of a regulated amount of the said hydrocarbon within the range of from 55 to 80 per cent thereof and while adjusting the velocity of the respective gas and air streams to facilitate viscous streamline flow of the highly heated gases through the combustion zone and to cause removal from the said zone of the carbon black thus formed in the flowing gas stream after a preselected period of exposure to heat therein varying from .05 of a second to not more than .4 seconds, and regulating the flow of hydrocarbon and air to the said combustion zone by the degree of pressure maintained within the said zone.

7. In the art of producing carbon black by the partial combustion of a hydrocarbon in a heated, unobstructed enclosed space, the improvement comprising burning natural gas within a combustion zone in a plurality of closely spaced, parallel thin flames each adapted to radiate a large portion of its heat to adjacent flames, each flame being surrounded by a stream of air flowing at approximately the same velocity as the natural gas within the flame, thereby maintaining stream-line viscous flow of the gases within the said combustion zone, the air being supplied in a regulated amount within the range from 55% to 80% of that required for complete combustion of the natural gas, and the absolute velocity of the natural gas and the air being adjusted to cause removal of the carbon black from the high temperature combustion zone after a preselected time of exposure to heat therein of between .05 and .4 seconds.

8. The method of producing carbon black which comprises inducing a flow into a heated, unobstructed combustion chamber, of regulated amounts respectively of gas and air in parallel thin streams, the thickness of each gas stream being less than ⅝ inch, partially burning the gas therein at the surfaces of contact thereof with the air, thereby producing a plurality of thin flames containing carbon black surrounded by a viscous flame front of combustion gases, limiting the time of exposure of the carbon black to the high temperature within the flame front to a preselected period of between .2 and .4 of a second, and thereafter cooling the resultant gaseous and solid products and recovering the carbon black.

9. The method of producing carbon black which comprises directing into a combustion chamber at least one flowing column of gas having an initial thickness of between ⅛ inch and ⅜ inch while concurrently directing into the chamber a flowing column of air surrounding each column of gas and moving in viscous streamline relation with respect to each of the latter, combusting a preselected portion of the gas within the range of from 55 to 80 per cent thereof, adjacent the surfaces of contact of the flowing gas and air columns thereby developing a high temperature flame zone and producing carbon black within each gas column, rapidly removing the carbon black from the high temperature flame zone after a preselected period of exposure to heat therein of between .05 and .4 seconds, and subsequently cooling and recovering the carbon black.

10. The method of producing carbon black which comprises establishing an upward streamline flow of a plurality of spaced sheets of hydrocarbon gas of regulated thickness within the range from ⅛ to ½ inch thickness, directing sheets of air flowing in non-turbulent streamline relation with respect to and upon each side of the said sheets of gas, burning selected portions of the gas while maintaining the gas and air streams free from atmospheric disturbance, thereby developing a high temperature reaction zone and producing carbon black in each sheet of the gas, and adjusting the absolute velocity of the gas streams thereby causing removal of the carbon black from the high temperature zone after a preselected period of exposure to heat therein ranging from .2 of a second to not more than .4 seconds.

11. The process of producing carbon black by the partial combustion of hydrocarbons in a highly-heated unobstructed enclosed zone, which comprises inducing by regulated suction the flow of a plurality of parallel thin alternate streams of combustion-supporting gas and of hydrocarbon gas through the said zone while adjusting by means of subatmospheric pressure maintained within the said enclosed zone both the relative velocities and absolute velocities of the respective hydrocarbon and combustion-supporting gas streams, thereby maintaining streamline substantially non-turbulent flow of the said streams through the said zone, the combustion-supporting gas being employed in amount required for the complete combustion of a selected portion of the hydrocarbon within the range from 55 to 80 per cent of the total hydrocarbon employed, burning portions of the hydrocarbon at the surfaces of contact of the respective streams, thereby producing heat and carbon black and maintaining viscous streamline flow of the gases, and regulating the absolute velocity of gas flow through the enclosed zone to remove the carbon black from the high temperature zone after a regulated period of exposure to heat therein within the range from .05 of a second to not more than .4 seconds.

12. In the art of producing carbon black by the partial combustion of hydrocarbons, the steps which comprise burning in a combustion zone a thin flowing stream of a hydrocarbon by the oxygen of an air stream flowing parallel to it and in contact therewith, while concurrently regulating the amounts of air and of hydrocarbon flowing to the said zone to provide an amount of air sufficient for the complete combustion of a fixed portion of the said hydrocarbon within the range of from 55 to 80 per cent thereof, and while adjusting the velocities of the respective gas and air streams to facilitate viscous streamline flow of the highly heated gases within the combustion zone, and to cause removal from the said zone of the carbon black formed in the flowing gas stream after a preselected period of exposure to heat therein within the range from .05 of a second to not more than .4 seconds, and regulating the respective amounts of hydrocarbon and air flowing to the combustion zone and the time of exposure of the carbon black within the said zone by the regulation of the degree of pressure maintained within the combustion zone.

13. In the art of forming carbon black by the partial oxidation of hydrocarbons in a heated, unobstructed, enclosed space, in accordance with which carbon black carrying gases are cooled, the carbon black recovered therefrom and the remaining gases discharged to a stack, the improvement which comprises inducing by means of natural draft a regulated continuous flow of alternate parallel streams of air and of a hydrocarbon gas through the said space while maintaining velocities of the respective gas and air streams facilitating substantially non-turbulent streamline flow, inducing by natural draft the flow to the said space of the respective air and gas streams in such proportions as continuously to provide air in amount sufficient for the complete combustion of a selected portion of the hydrocarbon gas within the range of 55 to 80 per cent thereof, burning selected portions of the said gas at the surfaces of contact of the air and gas streams, thereby producing a high temperature carbon black-forming zone, and regulating by means of natural draft the absolute velocity of the air and gas streams to cause removal from the high temperature zone of the carbon black after a period of exposure therein within the range from .2 second to .4 second.

THEODORE P. KELLER.